United States Patent [19]
Frutschi

[11] Patent Number: 5,481,865
[45] Date of Patent: Jan. 9, 1996

[54] METHOD FOR REGULATING A GAS-TURBINE ASSEMBLY EQUIPPED WITH TWO COMBUSTION CHAMBERS

[75] Inventor: Hans U. Frutschi, Riniken, Switzerland

[73] Assignee: ABB Management AG, Baden, Switzerland

[21] Appl. No.: 290,519

[22] Filed: Aug. 15, 1994

[30] Foreign Application Priority Data

Sep. 6, 1993 [EP] European Pat. Off. ............. 93114229

[51] Int. Cl.$^6$ ................................. F02C 9/00; F02G 3/00
[52] U.S. Cl. .................. 60/39.03; 60/39.161; 60/39.281
[58] Field of Search ............................. 60/39.03, 39.161, 60/39.281

[56] References Cited

U.S. PATENT DOCUMENTS

| | | | |
|---|---|---|---|
| 2,225,311 | 12/1940 | Lysholm | 60/39.03 |
| 3,054,257 | 9/1962 | Schelp | 60/39.17 |
| 3,668,867 | 6/1972 | van Staveren | 60/39.281 |
| 3,688,495 | 9/1972 | Fehler et al. | 60/39.281 |
| 3,729,929 | 5/1973 | Kiscaden | 60/39.281 |
| 3,777,479 | 12/1973 | Hagen | 60/39.161 |
| 3,882,672 | 5/1975 | Bauerfeind | 60/39.281 |
| 3,938,321 | 2/1976 | Davis et al. | 60/39.161 |
| 4,896,499 | 1/1990 | Rice | 60/39.161 |

Primary Examiner—Richard A. Bertsch
Assistant Examiner—Howard R. Richman
Attorney, Agent, or Firm—Burns, Doane, Swecker & Mathis

[57] ABSTRACT

In a method for regulating a gas-turbine assembly, essentially consisting of a compressor unit (1), of an HP-combustion chamber (4), of an HP-turbine (6), of an LP-combustion chamber (9), of an LP-turbine (12) and of a generator (14), the rating of the fuel quantity (FH) for the HP-combustion chamber (4) is carried out responsive to a corrected temperature signal which is formed by the value of the temperature (T13) at the outlet of the LP-turbine (12), reduced by the particular temperature rise ($\Delta T$) detectable there. This temperature signal (T13–$\Delta T$) is recorded in that the temperature rise ($\Delta T$) generated by the fuel quantity (FL) introduced into the LP-combustion chamber (9) is subtracted from the measured temperature at the outlet of the LP-turbine (12). The uncorrected temperature signal at the outlet of the LP-turbine (12) is used for rating the fuel quantity (FL) for the LP-combustion chamber (9).

2 Claims, 1 Drawing Sheet

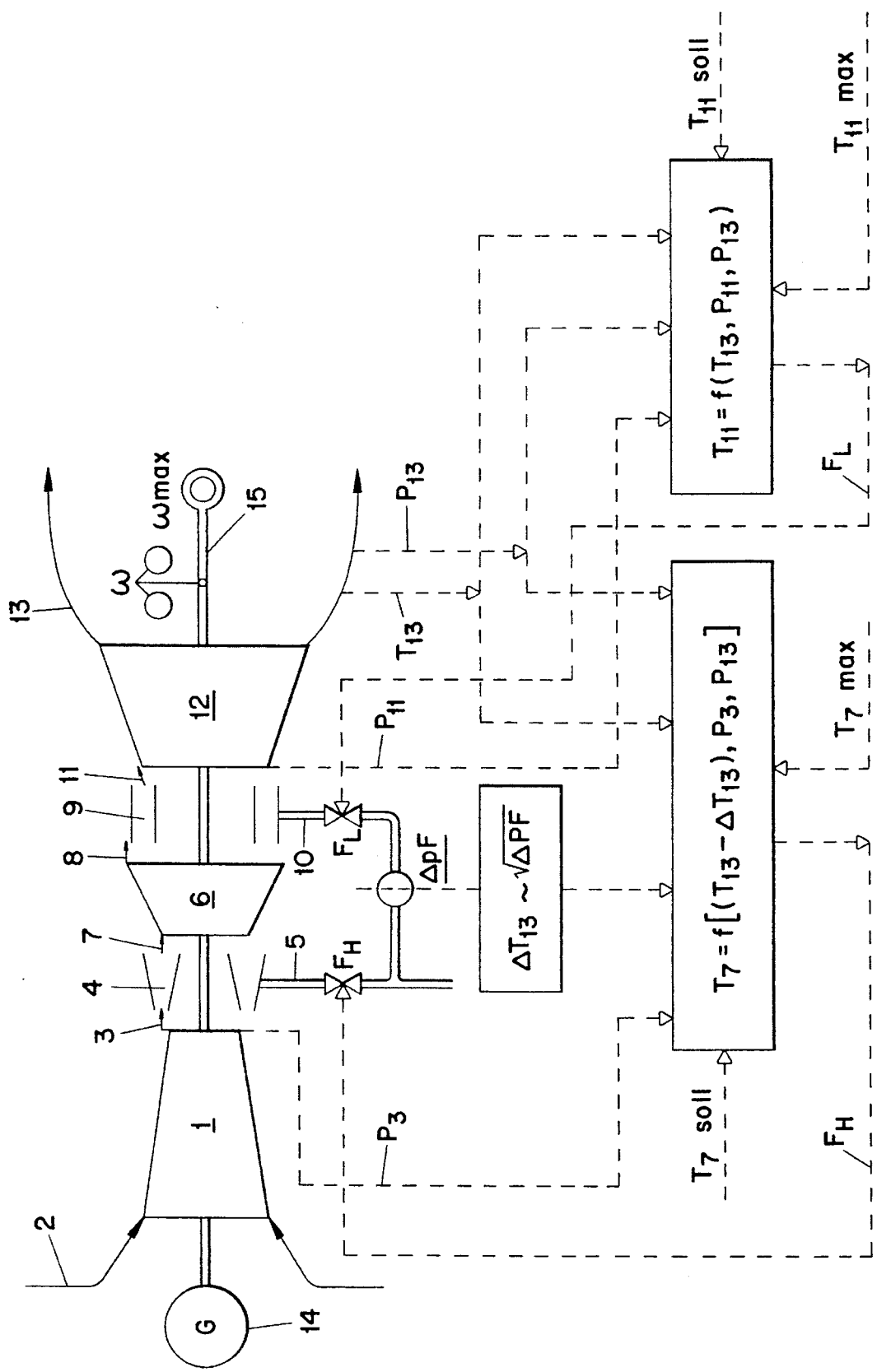

METHOD FOR REGULATING A GAS-TURBINE ASSEMBLY EQUIPPED WITH TWO COMBUSTION CHAMBERS

BACKGROUND OF THE INVENTION

1. Field of the Invention

The present invention relates to a method for regulating a gas turbine group having two combustion chambers.

2. Discussion of Background

In a gas-turbine assembly having two combustion chambers, one acting on the high-pressure side and the other on the low-pressure side, the control-related indispensable metering of the two fuel quantities for the HP-combustion chamber and the LP-combustion chamber would have to take place in such a way that at least the outlet temperatures of the two turbines located respectively downstream, especially the intentionally very high outlet temperature from the HP-turbine loaded by the hot gases of the HP-combustion chamber, would have to be recorded directly. As indicated, such temperature recording is difficult to carry out, and its reproducibility is not ensured, so that a reliable fuel regulation on the basis of such measurements is not guaranteed.

SUMMARY OF THE INVENTION

The invention is intended to remedy this. The invention, as defined in the claims, is based on the object, in a method of the type mentioned in the introduction, of allowing the recording of temperatures indispensable for regulation to take place at locations where reliable technical execution and repeatability are afforded.

The essential advantages of the invention are to be seen in that the regulation concept is based on the state of the art, so that only the easily recorded outlet temperature from the LP-turbine has to be measured. The measurement of the pressures additionally required downstream of the compressor and downstream of the HP-turbine takes place according to known principles, such as have been disclosed by the state of the art, and therefore it may be assumed that no difficulties can arise in this respect.

At the same time, the method according to the invention for regulating a gas-turbine assembly taken as a basis above proceeds from the fact that the temperature increase at the outlet of the LP-turbine, caused by the firing of the LP-combustion chamber, can be determined repeatably. Proceeding from this, a simple and reliable regulation concept for fuel metering into the two combustion chambers can therefore be prepared. In practical terms, this can be put into effect by subtracting the expected ΔT signal from the measured LP-turbine outlet temperature and by thus regulating the HP-fuel quantity. The regulation of the LP-fuel quantity takes place directly by means of the temperature signal at the outlet of the LP-turbine.

Advantageous and expedient developments of the solution according to the invention for achieving the object are defined in the further dependent claims.

An exemplary embodiment of the invention is explained in more detail below by means of the drawing. All elements not necessary for a direct understanding of the invention are omitted. The flow direction of the media and regulating pulses in the example shown are indicated by arrows.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein:

the single FIGURE shows a gas-turbine assembly together with an integrated regulation diagram.

DESCRIPTION OF THE PREFERRED EMBODIMENT

Referring now to the drawing, the FIGURE shows a gas-turbine assembly which, further below, forms the basis for the fuel regulation used. This gas-turbine assembly has a compressor unit 1, in which the compression of the intake air 2 takes place. The air 3 thus compressed then flows into a first combustion chamber, HP-combustion chamber 4, in which the provision of the first hot-gas generation by means of a fuel 5 takes place. Downstream of this HP-combustion chamber 4 operates a first turbine, HP-turbine 6, in which the hot gases 7 provided in the HP-combustion chamber 4 experience a partial expansion. This partial expansion is defined in that the exhaust gases 8 from the HP-turbine 6 still have a relatively high temperature of the order of magnitude of 1000° C. and above. Said HP-turbine 6 accordingly is composed of few rotor-blade stages, preferably 1 to 3 stages. Downstream of the HP-turbine 6 acts a second combustion chamber, LP-combustion chamber 9, which functions on an auto-ignition principle. The LP-combustion chamber 9 has essentially the form of an annular throughflow channel, into which preferably a gaseous fuel 10 is sprayed. At a temperature of the exhaust gases 8 from the HP-turbine at the aforesaid temperature level, an auto-ignition of the sprayed-in fuel 10 takes place in the LP-combustion chamber 9. This LP-combustion chamber 9 has flow aids (not shown) which bring about a stabilizing backflow in the region of the flame front in order to guarantee a reliable combustion operation. The exhaust gases 8 are thereafter treated again in the LP-combustion chamber 9, to form hot gases 11, the temperature of which corresponds approximately to that of the HP-combustion chamber 4. In principle, the temperatures of the hot gases 7, 11 have no direct thermodynamic limit; on the contrary, this limit is primarily predetermined by the turbine to be loaded and its machine elements. The hot gases 11 then load a second turbine, LP-turbine 12, in which the final expansion initially takes place. The residual calorific potential of the exhaust gases 13 can be utilized, for example, for the steam generation of a downstream steam circuit. A generator 14 ensures current generation from the work output of the two turbines 6, 12. An essential feature of the gas-turbine assembly shown is the unitary mounting of all the turbo-machines 1, 6, 12 on a continuous shaft 15 which is preferably supported on two bearings (not shown). The two combustion chambers 4, 9 occupy the intermediate space between the two turbines 6, 12, the HP-combustion chamber 4 preferably being designed as an annular combustion chamber and being capable of largely being superposed on the compressor unit 1, in such a way that this contributes substantially to causing the gas-turbine assembly to become a compact unit. This possibility cannot be implemented completely as regards the LP-combustion chamber 9 on account of fluidic considerations; it is nevertheless to be said here that the last-mentioned combustion chamber is very short, so that the intended aim of producing a compact gas-turbine assembly is achieved absolutely.

During the starting operation up to operation at half power, the gas-turbine assembly is operated solely as a result of the firing of the HP-combustion chamber. Initially partially closed compressor guide series are to be opened in succession. The regulation of the fuel quantity 5 for the HP-combustion chamber 4 takes place in the conventional way as a function of the temperature T13 at the outlet of the LP-turbine 12 and of the compressor output pressure p3 or the compressor pressure ratio $\pi$ according to the relation:

$$T7=A(T13-\Delta T13)+(B\cdot\pi)+C \tag{1}$$

A, B and C being the correcting elements adapted in the usual way. $\Delta T13$ provisionally still remains 0.

For the further loading of the machine, the fuel feed 10 to the LP-combustion chamber 9 is now activated, its regulation being taken over by means of a second conventional relation $$T11=(A'\cdot T13)+(B'\pi')+C' \tag{2}$$

with $\pi'=p11/p13$.

The temperature rise $\Delta T13$ at the outlet from the LP-turbine 12, resulting from the operation of the LP-combustion chamber 9 with the fuel quantity 5 of the LP-combustion chamber 4 kept constant, is introduced into the relation (1), so that the HP-combustion chamber 4 is regulated in the same way as if the LP-combustion chamber 9 were not in operation.

The correctness of the value $\Delta T13$ can be established by calibration on the occasion of each starting or stopping operation. It can also be reconstructed at any time by a small change in the fuel quantity 10 of the LP-combustion chamber 9 by $\Delta mFL$ (difference between mass flow and fuel quantity). This procedure presupposes an at least relative measurement of the fuel quantity 10 of the LP-combustion chamber 9. $\Delta T13$ can, of course, also be simulated by computer.

In order to obtain an especially good transition behavior in terms of regulation, it is advantageous to control the two fuel quantities (HP+LP) at least by means of a compressor outlet pressure p3, that is to say according to the relations $$mFH \sim p3 \cdot K1 \tag{3}$$

$$mFL \sim p3 \cdot K2 \tag{4}$$

the factors K1 and K2, that is to say $$mFH/p3 \tag{5}$$

and $$mFL/p3 \tag{6}$$

being adapted continuously by means of the relations (1) and (2).

The temperature-regulation mode shown can also be used for power and speed regulation, in which case the two Tmax signals have a limiting effect on the fuel quantities 5, 10.

As regards the speed regulation ($w=w_{des}$), normally only the HP-fuel quantity 5 is regulated, with the LP-combustion chamber 9 extinguished. This is because large machines are virtually never used for island operation and speed regulation is employed only for synchronization. However, it is also possible, after $T7=T7_{des}$ is reached, to cause the w-signal to act further on the LP-fuel quantity 10.

Conversely, power regulation $P=P_{des}$ could be made to act only on the LP-fuel quantity 10, since operation rarely takes place under half-load. However, it is also possible, after the extinguishing of the LP-combustion chamber 9, to transfer the P-signal to the HP-fuel quantity 5.

The following abbreviations are used in connection with the foregoing description:

w speed
$w_{max}$ maximum speed
FH fuel HP-combustion chamber
FL fuel LP-combustion chamber
$\Delta pF$ pressure difference diaphragm
p3 pressure compressor outlet
p5 pressure fuel HP-combustion chamber
p11 pressure inlet LP-turbine
p13 pressure outlet LP-turbine
T7 temperature inlet HP-turbine
T11 temperature inlet LP-turbine
T13 temperature outlet LP-turbine
m fuel quantity
K1 constant
K2 constant
$\Delta T$ temperature difference (rise)

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for regulating a gas-turbine assembly comprising, in a flow direction of a working gas stream, a compressor unit, a first combustion chamber connected downstream of the compressor unit, a first turbine connected downstream of the first combustion chamber, a second combustion chamber connected downstream of the first turbine which operates by autoignition, a second turbine connected downstream of the second combustion chamber, and at least one generator connected to be driven by the first and second turbines, the method comprising the steps of:

measuring a temperature T13 at an outlet of the second turbine;

determining a fraction $\Delta T$ of the temperature T13 generated by combustion of a fuel quantity supplied to the second combustion chamber;

determining a corrected temperature by subtracting the fraction $\Delta T$ from the measured temperature T13, wherein regulation of a fuel quantity supplied to the first combustion chamber is responsive the corrected temperature; and wherein regulation of the fuel quantity to the second combustion chamber is responsive to the temperature T13.

2. The method as claimed in claim 1, wherein the fuel quantity supplied to the first combustion chamber is determined on the basis of a desired change in the corrected temperature.

* * * * *